US008552083B1

(12) United States Patent
Taranekar et al.

(10) Patent No.: US 8,552,083 B1
(45) Date of Patent: *Oct. 8, 2013

(54) ULTRA LOW REFRACTIVE INDEX CURABLE COATINGS

(75) Inventors: Prasad Taranekar, Cleveland, OH (US); Austin L. Schuman, Wadsworth, OH (US); Asis Banerjie, Medina, OH (US)

(73) Assignee: Ovation Polymer Technology and Engineered Materials, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,004

(22) Filed: Jun. 29, 2011

Related U.S. Application Data

(63) Continuation-in-part of application No. 12/958,945, filed on Dec. 2, 2010.

(60) Provisional application No. 61/266,189, filed on Dec. 3, 2009.

(51) Int. Cl.
*C08F 2/46* (2006.01)
*C08J 3/28* (2006.01)
*C08G 18/28* (2006.01)

(52) U.S. Cl.
USPC .......... 522/97; 522/90; 522/96; 522/113; 522/114; 522/120; 522/124; 522/126; 522/131; 522/155; 522/156; 522/132; 522/150; 522/153; 522/174; 522/178; 522/185; 522/187; 522/186; 528/44; 528/59; 528/65; 528/67; 528/70; 528/75; 528/425

(58) Field of Classification Search
USPC ......... 522/90, 96, 113, 114, 120, 124, 126, 522/131, 132, 150, 152, 153, 155, 156, 174, 522/178, 185, 187, 186; 528/44, 59, 65, 528/67, 70, 75, 425
See application file for complete search history.

(56) References Cited

U.S. PATENT DOCUMENTS

| | | | |
|---|---|---|---|
| 4,508,916 A | 4/1985 | Newell et al. | 556/420 |
| 4,511,209 A | 4/1985 | Skutnik | 385/145 |
| 4,971,424 A | 11/1990 | Babarid et al. | 385/145 |
| 5,024,507 A | 6/1991 | Minns et al. | 385/145 |
| 5,239,026 A | 8/1993 | Babarid et al. | 526/245 |
| 5,690,863 A | 11/1997 | Schuman | 252/582 |
| 5,951,920 A | 9/1999 | Schuman et al. | 252/582 |
| 5,962,611 A | 10/1999 | Meijs et al. | 526/247 |
| 6,249,638 B1 | 6/2001 | Hale | 385/145 |
| 6,703,463 B2 | 3/2004 | Holguin et al. | 526/245 |
| 7,358,306 B2 | 4/2008 | Turri et al. | 525/130 |
| 7,390,854 B2 * | 6/2008 | Bekiarian | 525/326.3 |
| 7,575,847 B2 | 8/2009 | Jing et al. | 430/270.1 |
| 7,625,984 B2 | 12/2009 | Bekiarian | 525/404 |
| 2005/0261389 A1 | 11/2005 | Bratolavsky et al. | 522/71 |
| 2006/0099426 A1 * | 5/2006 | Bekiarian | 428/421 |

OTHER PUBLICATIONS

W. Groh, A. Zimmermann. What is the lowest refractive index of an organic polymer? Macromolecules, 1991, 24 (25), pp. 6660-6663. Dec. 1991.*

* cited by examiner

*Primary Examiner* — Sanza McClendon
(74) *Attorney, Agent, or Firm* — Alvin T. Rockhill

(57) ABSTRACT

The present invention relates to a radiation-curable composition having a refractive index less than 1.40 comprising (1) a curable perfluoropolyether oligomer having a structural formula selected from the group consisting of:

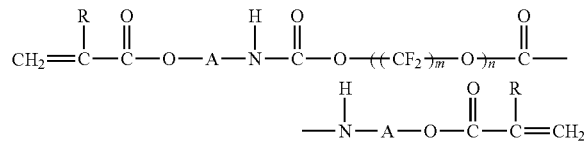

and

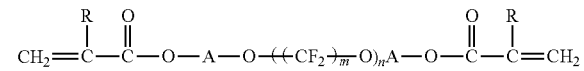

wherein R represents a hydrogen atom or a methyl group, wherein A represents a straight chained or branched alkylene group, wherein m represents an integer from 1 to 4, wherein the integers represented by m within individual $-((CF_2)_m-O)_n-$ repeat units can be the same or different, and wherein n represents an integer from 1 to 20; (2) a diluent; (3) a photo-initiator; and (4) an adhesion promoter; wherein the radiation-curable composition is free of compounds containing $-CF_3$ groups.

6 Claims, No Drawings

ULTRA LOW REFRACTIVE INDEX CURABLE COATINGS

This application is a continuation-in-part of U.S. patent application Ser. No. 12/958,945, filed on Dec. 2, 2010, which claims the benefit of U.S. Provisional Patent Application Ser. No. 61/266,189, filed on Dec. 3, 2009, and incorporates herein by reference the teachings thereof in their entirety.

BACKGROUND OF THE INVENTION

Fluoropolymers are often used for their desirable properties, such as low surface tension, high thermal stability, and high transparency in the ultra-violet to the IR region of the electromagnetic spectrum. Low refractive index polymers have properties such as low coefficient of friction, improved wear/abrasion resistance, enhanced chemical resistance, low surface energy, water/oil and stain repellency and improved surface smoothness and gloss.

Commercially available low-refractive index polymer coating formulations have cured indices on the order of 1.36 to 1.42. For example, see U.S. Pat. No. 5,951,920 and U.S. Pat. No. 5,690,863 which cover "OPTI→CLAD" formulations. The patent literature shows coatings with cured refractive indices in the range of 1.37 to 1.43 (see U.S. Pat. No. 4,508,916, U.S. Pat. No. 4,511,209, U.S. Pat. No. 4,971,424, U.S. Pat. No. 5,024,507, and U.S. Pat. No. 5,239,026). There are recent reports of low refractive index materials ranging from 1.32 to 1.35 in a cured state (see U.S. Pat. No. 7,625,984, United States Patent Publication 2005/0261389, U.S. Pat. No. 6,703,463, and U.S. Pat. No. 6,249,638). However, these patents still show a need for a UV curable low refractive index that can possess a high loading of photo-initiators, which have a broad absorption range and exhibit adequate rigidity and adhesive strength.

Currently there exists the need for ultra low refractive index materials which can be cured with a wide range of curing wavelengths, contain greater amounts of photo-initiators, can provide excellent adhesion to glass, plastic and metal substrates, and provide adequate rigidity. Such coatings can be used not only in optical applications but can be extended to applications such as anti-dust, anti-fogging, anti-graffiti and bio-medical applications.

SUMMARY OF THE INVENTION

An objective of this invention is low refractive index di-functional acrylated urethane cross-linkers suitable as an adhesive, hardener and compatibilizer to be used in UV-curable ultra low index coatings. Another objective of the invention is polymerizable compositions generating clear and ultra-low refractive index upon curing via UV-radiation ranging between 1.31 and 1.40. The ultra-low refractive index of the polymer composition will typically be within the range of 1.32 to 1.36 and will preferably be within the range of 1.32 to 1.34. An additional objective of the invention is to produce low viscosity (10-100 cps) solution compositions to produce ultra-thin and low index clear coatings.

The present invention more specifically discloses a radiation-curable composition having a refractive index less than 1.40 comprising (1) a curable perfluoropolyether oligomer having a structural formula selected from the group consisting of:

and

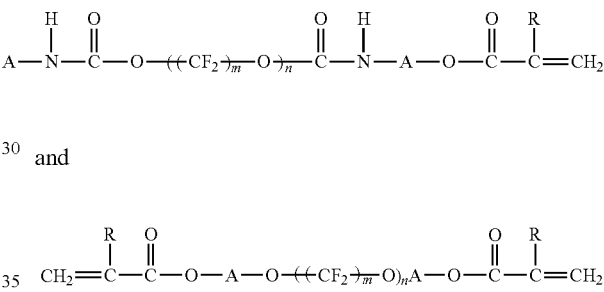

wherein R represents a hydrogen atom or a methyl group, wherein A represents a straight chained or branched alkylene group, wherein m represents an integer from 1 to 4, wherein the integers represented by m within individual —((CF$_2$)$_m$O)$_n$— repeat units can be the same or different, and wherein n represents an integer from 1 to 20; (2) a diluent; (3) a photo-initiator; and (4) an adhesion promoter.

The present invention also reveals a cross-linking agent which is particularly useful in making optically clear low refractive index coatings having the structural formula:

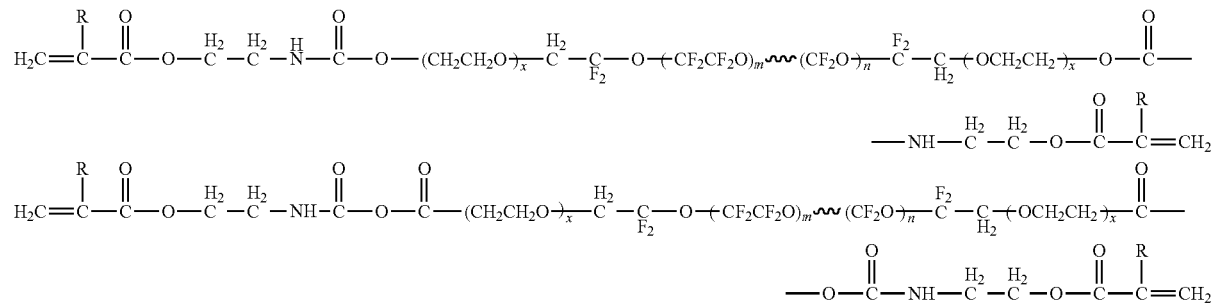

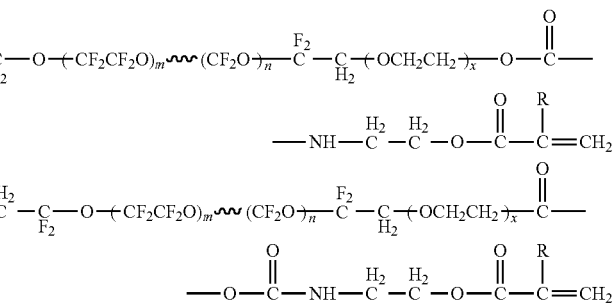

wherein R represents a hydrogen atom or a methyl group, wherein m represents an integer of 2 or higher, wherein n represents an integer of 2 or higher, wherein x represents an integer of 0 or higher and wherein ~ indicates that the —(CF$_2$CF$_2$O)— repeat units and the —(CF$_2$O)— repeat units can be distributed in any order, wherein R represents a hydrogen atom or a methyl group, wherein A represents a straight chained or branched alkylene group, wherein m represents an integer of 2 or higher, wherein n represents an integer of 2 or higher, and wherein ~ indicates that the —(CF$_2$CF$_2$O)— repeat units and the —(CF$_2$O)— repeat units can be distributed in any order. The ratio of the integer m to the integer n will typically be within the range of 1:1 to 3:1. These cross-linking agents will typically have a molecular weight which is within the range of 500 to 5,000 and will more typically be within the range of 1,000 to 4,000.

The subject invention further reveals an optical fiber cladding composition which is comprised of (1) an acrylate monomer of the formula: CH$_2$=CR$^1$COOR$^2$, wherein R$^1$ represents a hydrogen atom or a methyl group and wherein R$^2$ represents a fluoroalkyl group, and (2) a cross-linking agent which is particularly useful in making optically clear low refractive index coatings having a structural formula selected from the group consisting of:

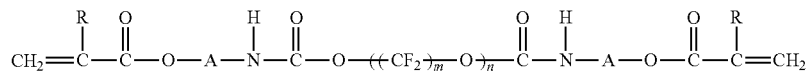

and

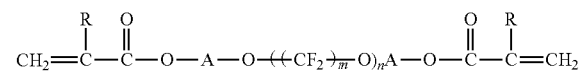

wherein R represents a hydrogen atom or a methyl group, wherein A represents a straight chained or branched alkylene group, wherein m represents an integer from 1 to 4, wherein the integers represented by n within individual —((CF$_2$)$_m$O)$_n$— repeat units can be the same or different, and wherein n represents an integer from 1 to 20.

DETAILED DESCRIPTION OF THE INVENTION

In order to overcome the current problems with ultra low refractive index coatings, as described in the background of invention section, the present invention describes methods of manufacturing UV-curable low refractive index di-functional compounds and compositions for producing a clear ultra low index coating; that can be cured using a broad range of UV-light exposure. In addition, the curing speed is enhanced due to high loading of photo-initiators in the composition. The cured clear coating also provides adequate hardness and adhesion to multiple substrates.

One embodiment of the present invention involves a room temperature process that allows for the implementation of a specific type of perfluoropolyether urethane di-functional cross-linker (PFDC). The PFDC's consist of (meth)acryl perfluoropolyether urethane which, in a further improved embodiment, exploits the compatiblizing, hardening, and adhesive function of the unique multifunctional (meth)acryl perfluoropolyether urethane ester cross-linker(s); which further enables a homogenous cured polymer matrix of the various fluorinated and non-fluorinated components, photo-initiators, and additional adhesion promoters of the current invention; to provide the low index coating material with the aforementioned physical properties. The cross-linking agents utilized in the practice of the present invention have a structure selected from the group consisting of:

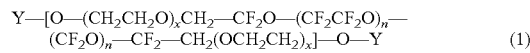 (1)

and

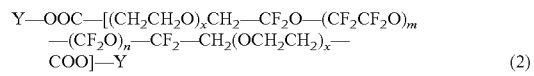 (2)

wherein m represents an integer of 2 or higher, wherein n represents an integer of 2 or higher, wherein x represents an integer of 0 or higher and wherein ~ indicates that the —(CF$_2$CF$_2$O)— repeat units and the —(CF$_2$O)— repeat units can be distributed in any order, wherein n represents an integer of 2 or higher, and wherein ~ indicates that the —(CF$_2$CF$_2$O)— repeat units and the —(CF$_2$O)— repeat units can be distributed in any order. The ratio of the integer m to the integer n will typically be within the range of 1:1 to 3:1. These cross-linking agents will typically have a molecular weight which is within the range of 500 to 5,000 and will more typically be within the range of 1,000 to 4,000.

The PFDC's of the current invention are shown as structure (1) and (2) with telechelic group Y, wherein the Y groups represent hydrocarbon groups containing a urethane moiety and a (meth)acrylate functionality and n represent an integer between 0 and 10. The effective method of synthesis in which quantitative yields are achieved is to generate by room temperature reaction of a perfluoropolyether diol or perfluoropolyether di-acid with 2-isocyanatoethyl methacrylate or 2-isocyanatoethyl acrylate. Catalysts for the urethane reaction, such as dibutyltin dilaurate and the like, are suitable for this purpose. The resulting PFDC with broad compatibility characteristics are obtained which allows for fluorocarbon and hydrocarbon monomers to be homogenously mixed with a broad range of photo-initiators into a stable solution to be formed and applied in a uniform manner to be cured in a clear film or sheet. As one trained in the art can see, the perfluoropolyether segment of the molecule allows for low refractive index characteristics, the urethane segment allows for adhesive properties and compatiblization and the meth(acrylate) di-functional groups are used to provide curable groups. The fluorinated polyols that may be used in the preparation of the fluorinated urethane oligomer include fluorolink fluids series of products such as Fluorolink C, D, D10-H, D10, E, E10, T, and T10 series of products, marketed by Solvay-Solexis Inc. Other suitable fluorinated polyols include polyols such as L-12075 marketed by 3M Corporation and the MPD series of polyols marketed by Dupont. Other types of PFDC are reported in U.S. Pat. No. 7,358,306, U.S. Pat. No. 7,575,847 and U.S. Pat. No. 5,962,611; however they both record the use of perfluoropolyether diols having a number average molecular weight from higher than 2,000 and the synthesis requires the use of high temperatures.

In another embodiment of this invention, the UV-curable ultra low index compositions are described which contains commercially available viscous curable perfluoropolyether oligomers, various functional fluorinated and non-fluorinated diluents, adhesion promoters, cure enhancers, anti-oxidants, light stabilizers photo-initiator(s), non-CF$_3$ based fluorinated acrylic oligomers and optionally the PFDC compounds. Compositions using the aforementioned materials have been exploited to generate ultra low refractive index clear coatings with desirable physical properties, cure times with a wide range of curing wavelengths.

Preferred high viscosity UV curable non-CF$_3$ based fluorinated acrylic oligomers with high fluorine containing materials include but are not limited to CN4000, CN4001, CN4002, CN4003 and PRO12062 available from Sartomer. These oligomers allow for a broader viscosity range from 10 cps to 20,000 cps, typically from 100 cps to 10,000 cps, and more typically from 250 cps to 5,000 cps than previously reported without the need for of any —CF$_3$ groups. Oligomers which are free of —CF$_3$ groups are deemed to be environmentally advantageous due to the fact that the Environmental Protection Agency (EPA) has issued regulations placing greater scrutiny on polymeric materials formed containing —CF$_3$ groups. The multi-functional low index perfluoropolyether oligomers are also available from Solvay Solexis Inc. under the trade name of Fluorolink® MD 700, Fluorolink® MD 500, and Fomblin® MD 40. In addition, multi-functional perfluoropolyether oligomers are available from Solvay Solexis Inc. under the trade name of 5101X and 5113X. Another group of commercially available low refractive index perfluoropolyether compounds that can be used include a perfluoropolyether caprolactone diacrylate compound, available from Cytonix Corporation, Beltsville, Md., marketed under the trade name Fluor™ N 1939A and perfluoropolyether glycol diacrylate, also available from Cytonix Corporation under the tradename Fluor™ N 1970A.

Various functional fluorinated diluents used in the coating composition are chosen from monofunctional perfluorinated monomers, also referred to as perfluoro mono (meth)acrylate because of their low refractive indices which maybe straight or branched chained. The term "(meth)acrylate" as employed herein includes acrylic or methacrylic acid, esters of acrylic or methacrylic acid and derivatives and mixtures thereof. Individually, they are referred to as "(meth)acrylate" monomers. Examples of fluorinated (meth)acrylate monomers that can be used are 1H,1H-Heptafluorobutyl(meth)acrylate, 1H,1H,5H-octafluoropentyl(meth)acrylate, 2,2,3,4,4,4-Hexafluorobutyl(meth)acrylate, 2,2,3,4,4,4-Hexafluorobutyl (meth)acrylate, perfluorooctylethyl(meth)acrylate, trifluoroethyl(meth)acrylate, trifluoroethyl(meth)acrylate, and perfluorooctylethyl(meth)acrylate. Among the mono acrylates that may be used are, for example, those of the formula: $CH_2=CR^1COOR^2$ wherein $R^1$ represents a hydrogen atom or a methyl group (—CH$_3$group) and wherein $R^2$ represents a linear or branched fluoroalkyl group. The fluoroalkyl group $R^2$ is a fluoroalkyl having 2 to 20 carbon atoms. For example, the fluoroalkyl group may be one of: —CH$_2$CF$_3$, —CH$_2$C$_2$F$_5$, —CH$_2$C$_3$F$_7$, —CH$_2$C$_4$F$_9$, —CH$_2$C$_5$F$_{11}$, —CH$_2$C$_7$F$_{15}$, —CH$_2$C$_8$F$_{17}$, —CH$_2$C$_9$F$_{19}$, —CH$_2$C$_{10}$F$_{21}$, —CH2CH2CF3, —CH2CH2C2F5, —CH2CH2C3F7, —CH2CH2C4F9, —CH$_2$CH$_2$C$_5$F$_{11}$, —CH$_2$CH$_2$C$_7$F$_{15}$, —CH$_2$CH$_2$C$_8$F$_{17}$, —CH$_2$CH$_2$C$_9$F$_{18}$, —CH$_2$CH$_2$C$_{10}$F$_{21}$, —CH$_2$(CF$_2$)$_2$H, —CH$_2$(CF$_2$)$_4$H, —CH$_2$(CF$_2$)$_6$H, —CH$_2$(CF$_2$)$_8$H, —CH$_2$(CF$_2$)$_{10}$H, —CH(CF$_3$)$_2$, —CH$_2$CF$_2$CHFCF$_3$, —CH$_2$CF$_2$CHF(CF$_2$)$_6$H, —CH$_2$CF(CF$_3$)CHFCF(CF$_3$)$_2$, —CH$_2$C$_6$HF$_{12}$, —C$_6$HF$_{12}$, and —CH$_2$C$_{10}$HF$_{20}$. Although, the fluorinated monofunctional (meth)acrylate monomers provide good cure rates, low refractive indexes, and good chemical and thermal resistance; the perfluorinated alkyl groups begin to crystallize or form order within the polymer backbone, at chain lengths greater than 8 carbon atoms long, which inherently produce a lack of adhesive characteristics, but provide very high chemical resistance to common solvents and environmental conditions. Therefore, it is necessary minimize these certain perfluoro mono (meth)acrylate monomers during the final copolymerization step in the coating matrix and provide perfluoro difunctional (meth)acrylates including; but not limited to, perfluorohexyl diacrylate, perfluorodecyl diacrylate, perfluoropentyl diacrylate, perfluorododecyl diacrylate and the corresponding methacrylates of such.

Various functional non-fluorinated diluents used in the coating composition are chosen from aromatic and aliphatic both straight chains and cyclic compounds. Examples of suitable (meth)acrylate monomers are (meth)acrylate esters such as alkyl(meth)acrylates that have 1-15 carbon or fluorine atoms in the alkyl group such as methyl(meth)acrylate, ethyl (meth)acrylate, n-propyl(meth)acrylate, n-butyl(meth)acrylate, isopropyl(meth)acrylate, isobutyl(meth)acrylate, t-butyl (meth)acrylate, n-amyl(meth)acrylate, n-hexyl(meth) acrylate, isoamyl(meth)acrylate, 2-ethylhexyl(meth) acrylate, nonyl(meth)acrylate, lauryl(meth)acrylate, stearyl (meth)acrylate, and the like. Cycloaliphatic (meth)acrylates also can be used such as trimethylcyclohexyl(meth)acrylate, t-butylcyclohexyl(meth)acrylate, cyclohexyl(meth)acrylate, isobornyl(meth)acrylate, perfluorocyclohexylmethyl acrylate and the like. Aryl or aromatic (meth)acrylates can also be used such as benzyl(meth)acrylate, phenyl(meth)acrylate, 2-(4-(2-phenylpropan-2-yl)phenoxy)ethyl(meth)acrylate and the like.

In another embodiment of the present invention, adhesion promoters are added to the low index coating matrix by vinyl and (meth)acrylated monomers with examples of such as follows: carboxyl or other acid functional monomers such as (meth)acrylic acid, maleic acid, vinyl phosphonic or vinyl phosphoric acid; hydroxy functional acrylic monomers such as hydroxyethyl(meth)acrylate, hydroxypropyl(meth)acrylate, 2-hydroxypropyl(meth)acrylate, 3-hydroxypropyl (meth)acrylate, hydroxybutyl(meth)acrylate; carbamate functional (meth)acrylic monomers such as 2-(methoxycarbonyl)aminoethyl(meth)acrylate, 2-(cyclohexoxycarbonyl) aminoethyl(meth)acrylate and 2-propenyloxyethyl carbamate; silane functional (meth)acrylic monomers such as vinyl or (meth)acrylic alkoxy silane monomers such as vinyl trimethoxy silane, vinyl methyldimethoxy silane, vinyl triethoxy silane, and vinyl tris (2-methoxyethoxy) silane, gamma-(meth)acryloxy propyl trimethoxysilane.

In addition, various other (meth)acrylate monomers can be used that have pendant functional groups such as hydroxyl, silane, epoxide, carboxyl or other acid, anhydride, isocyanate, carbamate, and amine groups. Combinations of monomers containing the above-mentioned functional groups are suitable, provided that they do not react with each other under polymerization and storage conditions.

Multi-functional (meth)acrylate monomers having greater than two (meth)acrylate groups are used in the UV-curable coating compositions of the present application. Commercially available multi-functional (meth)acrylate monomers that are available from the Sartomer Company, Inc. include: difunctional (meth)acrylate monomers, 1,6-hexanediol diacrylate, tetraethylene glycol diacrylate, neopentyl glycol dimethacrylate, triethylene glycol diacrylate, 1,12 dodecanediol dimethacrylate, 1,3-butylene glycol diacrylate, 1,3-butylene glycol dimethacrylate, 1,3-butylene glycol dimethacrylate, 1,4-butanediol diacrylate, 1,4-butanediol dimethacrylate, alkoxylated aliphatic diacrylate, alkoxylated cyclohexane dimethanol diacrylate, alkoxylated hexanediol diacrylate, alkoxylated neopentyl glycol diacrylate, alkoxylated neopentyl glycol diacrylate, cyclohexane dimethanol diacrylate, cyclohexane dimethanol dimethacrylate, diethylene glycol diacrylate, dipropylene glycol diacrylate, polyethylene glycol (1000) dimethacrylate, polyethylene glycol dimethacrylate, polypropylene glycol (400) dimethacrylate, tetraethylene glycol diacrylate, tetraethylene glycol dimethacrylate, tricyclodecane dimethanol diacrylate, triethylene glycol diacrylate, tripropylene glycol diacrylate, tripropylene glycol diacrylate, tripropylene glycol diacrylate and other like compounds.

Tri-functional or higher (meth)acrylate monomers that are useful in the practice of this invention include: trimethylolpropane triacrylate, trimethylolpropane triacrylate, trimethylolpropane triacrylate, tris(2-hydroxy ethyl) isocyanurate triacrylate, pentaerythritol triacrylate, ethoxylated (3) trimethylolpropane triacrylate, ethoxylated (3) trimethylolpropane triacrylate, propoxylated (3) trimethylolpropane triacrylate, ethoxylated (6) trimethylolpropane triacrylate, dipropylene glycol diacrylate, propoxylated (3) glyceryl triacrylate, propoxylated (3) glyceryl triacrylate, pentaerythritol tetraacrylate, and other like compounds.

The ultra low refractive index UV-curable coating compositions of the present invention may further comprise at least one cure enhancing agent, a hindered amine light stabilizer (HALS), and an antioxidant. Such agents may promote the rate at which the curable composition may enhance cure rate, produce a more complete cure and give additional thermal and ultra-violet light stability. The examples of cure enhancing agents include diamines, phosphines, phosphites and thiols. Commercially available cure enhancers or synergists include, for example, CN 371, CN 373, CN383US, CN 384US, CN386US available from Sartomer and Ebecryl® 7100, Ebecryl® 104, Ebecryl® P115 available from Cytec Industries Inc. Suitable antioxidants are non-ionic antioxidants\ and, comprise one or more stearically hindered phenols such as IRGANOX® 3052, IRGANOX® 1010, IRGANOX® 1035, IRGANOX® 1076 available from Ciba now BASF. To prevent degradation and increase the durability of coatings, liquid type light stabilizers are used such as Eversorb® 80, Eversorb® 81, Eversorb® 93 and Eversorb® UR210 available from Everlight Chemical Company. Eversorb® UR210 is a preferred choice because it does not conflict with the photo-initators, hence the cure speed is retained.

The photoinitiator is selected from the group consisting of 1-phenyl-2-hydroxy-2-methyl-1-propanone, 2 hydroxy 2-methyl 1-phenyl propan-1-one, 1-hydroxycyclohexyl phenyl ketone, benzophenones, bis-acyl phosphine oxide (BAPO), aminoketones, thioxanthones, cationic photoinitiators and mixtures thereof. The examples of such photo-initiators that are commercially available are Lucirin® TPO-L (2,4,6-trimethylbenzoylphenyl phosphinate), 2-Benzyl-2-(dimethylamino)-1-[4-(4-morpholinyl)phenyl]-1-butanone (Photoinitiator-369), 2,4,6-Trimethyl benzoyl diphenyl phosphine oxide (TPO). Surface curing can be promoted by adding or combining other initiators such as Irgacure® 184, Irgacure® 500, Darocur® 1173, or Esacure®1 KIP 100 F.

Polymerization is subsequently initiated by subjecting the monomer(s) to UV light. These ultra low refractive index compositions are strongly affected by oxygen inhibition, which is especially pronounced on very thin coatings (<5 μm thick). It is therefore required that UV-curing be performed under an inert gas atmosphere, such as a nitrogen or argon blanket. If curing in air for 10 μm or higher thickness, a medium pressure mercury lamp (H-bulb 200-300 nm) can be used to enhance curing. No nitrogen or argon blanket is required if curing is done in sandwiched configuration such as between two glass slides. For continuous curing, a D-bulb is used with two passes at speed no more than 5 m/min and 10 inch bulbs and broad UV light wavelength i.e. 250 nm to 400 nm is used.

The mixture of the various components described above results in ultra-low index coating compositions, provides good surface qualities and smoothness, and is otherwise relatively free of objectionable defects in the final cured coating. The method described above also provides various routes to achieve a two coating composition which may exhibit specifically different physicochemical properties but maintain a specific low refractive index; enabling ease of manufacturing a specific low refractive index coating with various physical properties which also enable the present invention to be used in a wide variety of market sectors and applications.

Another advantage of the low index composition of present invention is good adhesive properties to multiple substrates such as glass, plastics and metal substrates. Although the addition of specific adhesion promoters for a particular substrate is known in the art, very limited adhesion promoters and combinations of adhesion promoters work with non-$CF_3$ based fluorinated acrylic oligomers. Materials having a low refractive index within the range of 1.32-1.36 have limited tolerance for adhesion promoters in terms of choice of adhesive reactive diluents and quantity, while compositions having a higher refractive index within the range of 1.37-1.40 have wider acceptance of adhesion promoters and are less sensitive to the amount utilized.

This invention is illustrated by the following examples that are merely for the purpose of illustration and are not to be regarded as limiting the scope of the invention or the manner in which it can be practiced. These examples illustrate the vast array of materials that are made available through the process of the present invention and do not in anyway limit the process of manufacture of such advanced coatings having low refractive indices as described herein unless specifically indicated otherwise, parts and percentage are given by weight.

EXAMPLE A

Synthesis of PFDC Cross-Linker

In this experiment, 329.0 grams of Fluor® Link® D10H (82.21 weight percent was added to 70.3 grams of (17.57 weight percent) of 2-methacryloyloxyethyl isocyanate with 0.9 grams of dibutyltin dilaurate (0.22 weight percent for a total batch size of 400.2 grams to produce low index cross linker (hereafter referred to as "AF"). FT-IR was run on the initial solution mixture and was monitored until the completion of the reaction. FT-IR showed the generation of OH— and NH— peaks and the loss of the NCO— triple bond peaks to ensure quantitative yields in the product. Reaction rates of the product were very fast and showed completion within 30 minutes of reaction time in the case of the 400.2 grams batch. The oligomer refractive index was measured to be 1.3420 @ 589 nm @ 25° C., and the viscosity was determined to be 650 centipoises (cPs) @ 25° C.

FT-IR shows NH— peaks at 3358 $cm^{-1}$, C=O peak of amide at 1720 $cm^{-1}$, and the disappearance of the NCO— peak of the starting material which confirmed the formation of PDFC.

EXAMPLE B

Low Index Curable Coating Compositions

Various clear low index compositions are described in Tables 1-12 with the refractive index of the compositions ranging between 1.32 and 1.40 as measured at 589 nm and 25° C. The polymerization was performed using various photoinitiators and their combinations and exposing them to the broad range ultra-violet bulb radiation having intensity of 100-1000 μWatt/$cm^2$. Various curing speeds were monitored by measuring exothermic temperatures and time using in-situ thermo-couples and a four channel temperature-time recorder. The general curing speeds were found to between 30 seconds and two minute for 0.25 mm thick films. In general, the curing speeds should be much faster if high intensity ultra-violet radiation is used at thinner coating thicknesses. Table 13 describes a few of the mechanical properties of the ultra low index cured films and was annealed at 70° C. for a period of 24 hours prior to any measurements. In addition, Table 13 also describes thermo-gravimetric analysis (TGA) to show thermal stabilities of the cured coatings and viscosities of the ultra low index composition, which the viscosity was measured using a Brookfield viscometer.

TABLE 1

| Components | 1 | 2 | 3 | 5 | 6 | 7 | 8 | 9 | 10 | 11 |
|---|---|---|---|---|---|---|---|---|---|---|
| AF | 9.95 | 9.93 | 10.36 | 10.16 | 10.48 | 10.39 | — | — | — | — |
| MD500 | — | — | — | — | — | — | — | — | — | 34.79 |
| MD700 | — | — | — | — | — | — | — | — | — | 13.47 |
| 4001 | — | — | — | — | — | — | 80.51 | 80.51 | 79.86 | 37.38 |
| MD40 | 84.83 | 85.16 | 87.95 | 87.17 | 88.94 | 89.16 | — | — | — | — |
| MAA | 0.94 | 1.07 | — | 1.10 | — | — | 1.55 | 1.55 | 0.53 | 2.23 |
| DDA | — | — | — | — | — | — | 16.06 | 16.06 | 18.36 | 6.87 |
| HDDA | — | — | — | — | — | — | — | — | — | 3.39 |
| Eb7100 | 0.090 | — | — | — | — | — | — | — | — | — |
| Ir3052 | 0.065 | — | — | — | — | — | — | — | — | — |
| UR210 | 0.055 | — | — | — | — | — | — | — | — | — |
| PI-1173* | 4.07 | — | 1.69 | — | 0.58 | — | 1.88 | — | — | 1.87 |
| PI-TPOL** | — | 3.84 | — | 1.57 | — | 0.46 | — | — | — | — |
| PI-4265*** | — | — | — | — | — | — | 1.88 | 1.25 | — | — |
| Polymer RI | 1.3299 | 1.3299 | 1.3297 | 1.3260 | 1.3215 | 1.3224 | 1.3280 | 1.3275 | 1.3244 | 1.324 |
| Shore D/A | 15D/87A | 19D/85A | 14D/90A | 22D/91A | 14D/84A | 13D/83A | — | — | — | — |

Photo-initiator (PI) Curing wavelength (λ): *230-330 nm, 280-390 nm, *250-400 nm

TABLE 2

1.32 & 1.33 Formulations

| Components | 1 | 2 | 3 | 4 |
|---|---|---|---|---|
| CN4003 | — | 1.55 | — | 1.58 |
| PRO12062 | — | 0.82 | — | 0.83 |
| CN4001 | — | 2.07 | — | 2.11 |
| MD700 | 22.17 | 4.90 | 24.04 | 4.99 |
| MD40 | 73.87 | 85.83 | 72.06 | 87.44 |
| 8FM | — | 0.10 | — | 0.10 |
| 8F | — | 0.06 | — | 0.06 |
| MAA | 0.75 | 1.11 | 0.75 | 0.37 |
| 3X | — | 0.50 | — | 0.51 |
| HDDA | 0.80 | 0.27 | 0.76 | 0.28 |
| Neo | — | 0.29 | — | 0.29 |
| Eb7100 | — | — | 0.01 | — |
| Ir3052 | — | — | 0.01 | — |
| UR210 | — | — | 0.02 | — |
| PI-1173* | 2.41 | 1.46 | 2.35 | 0.83 |
| PI-TPOL** | — | 1.04 | — | 0.61 |
| Polymer RI | 1.332 | 1.330 | 1.335 | 1.328 |
| Shore D/A | 20D/85A | 20D/85A | 20D/85A | 20D/85A |

Photo-initiator (PI) Curing wavelength(λ):
*230-330 nm,
**280-390 nm

TABLE 3

| Components | 1 | 2 | 3 | 4 | 5 | 6 | 7 | 8 | 9 | 10 |
|---|---|---|---|---|---|---|---|---|---|---|
| AF | 2.87 | 9.21 | 2.84 | 10.00 | 9.89 | 1.51 | 9.20 | 9.21 | — | — |
| MD500 | 54.86 | — | 54.24 | — | — | 24.34 | — | — | — | — |
| MD700 | 33.38 | 28.85 | 33.03 | — | — | 23.04 | 28.83 | 28.86 | — | — |
| 4001 | — | — | — | — | — | 26.99 | — | — | 83.39 | 83.89 |
| 4000 | — | — | — | — | — | 16.37 | — | — | — | — |
| MD40 | — | 55.86 | — | 84.95 | 84.00 | — | 55.82 | 55.88 | 15.82 | 13.70 |
| 8FM | — | — | — | — | — | — | — | — | — | — |
| MAA | 3.28 | 1.09 | 4.02 | 0.99 | 0.97 | 3.13 | 1.08 | 1.08 | — | 0.97 |
| FFA | 1.23 | — | 1.18 | — | — | 0.73 | — | — | — | — |
| HDDA | 3.42 | 1.08 | 3.75 | — | — | 2.22 | 1.08 | 1.08 | — | — |
| Eb7100 | — | 0.090 | — | — | — | — | — | — | — | — |
| Ir3052 | — | 0.065 | — | — | — | — | — | — | — | — |
| UR210 | — | 0.055 | — | — | — | — | — | — | — | — |
| PI-1173* | 0.55 | 3.92 | 0.34 | 4.07 | 5.14 | — | 1.97 | 3.90 | 0.79 | 0.72 |
| PI-TPOL** | — | — | — | — | — | 0.60 | 2.02 | — | — | — |
| PI-4265*** | 0.41 | — | 0.40 | — | Hazy | 1.08 | — | — | — | 0.72 |
| Polymer RI | 1.335 | 1.338 | 1.333 | 1.3349 | 1.3349 | 1.338 | 1.33 | 1.33 | 1.3332 | 1.3365 |
| Shore D/A | 32D | — | — | 15D/88A | 15D/88A | — | — | — | — | — |

Photo-initiator (PI) Curing wavelength (λ): *230-330 nm, 280-390 nm, *250-400 nm

TABLE 4

| Components | 1 | 2 | 3 | 4 | 5 | 6 | 7 | 8 |
|---|---|---|---|---|---|---|---|---|
| AF | 27.53 | 27.44 | 1.195 | — | — | — | — | — |
| MD500 | — | — | 55.315 | — | — | — | — | — |
| MD700 | 22.72 | 22.64 | 36.865 | — | — | — | — | — |
| 4001 | — | — | — | — | — | — | 63.69 | 79.79 |
| 4000 | — | — | — | 95.85 | 93.39 | 91.16 | — | — |
| MD40 | 42.1 | 41.96 | — | — | — | — | — | — |
| 468 | — | — | — | — | — | — | 30.04 | — |
| 322 | — | — | — | — | — | — | — | — |

TABLE 4-continued

| Components | 1 | 2 | 3 | 4 | 5 | 6 | 7 | 8 |
|---|---|---|---|---|---|---|---|---|
| 8FM | — | — | — | — | — | — | — | 13.14 |
| MAA | 1.05 | 1.04 | 1.195 | 0.8 | 2 | 2.02 | 0.68 | 0.92 |
| FFA | — | — | 0.585 | — | — | — | — | — |
| Neo | 1.01 | 1.01 | — | — | — | — | — | — |
| DDA | — | — | — | — | 2.4 | 6.09 | 4.48 | 4.81 |
| PDA | — | — | — | 2.39 | 1.5 | — | — | — |
| HDDA | 1.72 | 1.72 | 3.655 | — | — | — | — | — |
| Eb7100 | — | — | 0.090 | — | — | — | — | — |
| Ir3052 | — | — | 0.065 | — | — | — | — | — |
| UR210 | — | — | 0.055 | — | — | — | — | — |
| PI-1173* | 3.88 | 2.30 | 0.490 | — | — | — | — | 0.66 |
| PI-TPOL** | — | 1.90 | — | — | — | — | — | — |
| PI-4265*** | — | — | 0.490 | 0.96 | 0.69 | 0.73 | 1.12 | 0.69 |
| Polymer RI | 1.341 | 1.346 | 1.341 | 1.3493 | 1.3492 | 1.3492 | 1.3399 | 1.3407 |
| Shore D/A | 25D | 25D | — | — | — | — | — | — |

Photo-initiator (PI) Curing wavelength (λ): *230-330 nm, 280-390 nm, *250-400 nm

TABLE 5

1.34 Formulation

| Components | 1 | 2 | 3 |
|---|---|---|---|
| CN4003 | — | 1.92 | — |
| PRO12062 | — | 1.45 | — |
| CN4001 | — | 2.49 | — |
| MD700 | 50.05 | 25.06 | 49.01 |
| MD40 | 42.02 | 62.41 | 43.01 |
| 8FM | — | 0.14 | — |
| 8F | — | 0.13 | — |
| MAA | 1.14 | 0.94 | 1.03 |
| 3X | — | 0.64 | 0.88 |
| HDDA | 1.81 | 1.25 | 0.87 |
| Neo | 1.03 | 0.47 | 1.14 |
| Eb7100 | — | — | 0.03 |
| Ir3052 | — | — | 0.01 |
| UR210 | — | — | 0.02 |
| PI-1173* | 3.95 | 1.79 | 4.00 |
| PI-TPOL** | — | 1.34 | — |
| Polymer RI | 1.345 | 1.342 | 1.347 |
| Shore D/A | 20D/85A | 22D/88A | 20D/85A |

Photo-initiator (PI) Curing wavelength(λ):
*230-330 nm,
**280-390 nm

TABLE 6

| Components | 1 | 2 | 3 | 4 | 5 | 6 |
|---|---|---|---|---|---|---|
| AF(%) | 36.43 | 18.92 | 44.595 | 44.66 | 44.66 | 32.15 |
| MD500 | — | — | — | — | — | 10.66 |
| MD700 | 15.67 | 69.32 | 16.925 | 16.93 | 16.93 | 20.89 |
| MD40 | — | — | 29.185 | 29.24 | 29.24 | — |
| 468 | 5.60 | — | — | — | — | — |
| 8A | 25.12 | — | — | — | — | 26.62 |
| 322 | — | — | — | — | — | 99.42 |
| 222 | — | — | — | — | — | — |
| ASA | — | 1.46 | — | — | — | 2.76 |
| MAA | 8.30 | 3.90 | 1.005 | 1.04 | 1.04 | 1.63 |
| Neo | 8.30 | — | 1.925 | 1.97 | 1.97 | 3.56 |
| HDDA | — | — | 2.225 | 2.25 | 2.25 | — |
| Eb7100 | — | — | 0.090 | — | — | — |
| Ir3052 | — | — | 0.065 | — | — | — |
| UR210 | — | — | 0.055 | — | — | — |
| PI-1173* | 0.31 | 0.88 | 3.930 | 3.92 | 1.94 | — |
| PI-TPOL** | — | — | — | — | 1.97 | — |
| PI-4265*** | 0.26 | — | — | — | — | 0.83 |
| PI-2022**** | — | — | — | — | — | 0.91 |
| PI-213***** | — | 0.76 | — | — | — | — |
| Polymer RI | 1.356 | 1.351 | 1.355 | 1.352 | 1.353 | 1.3564 |
| Shore D/A | 60D | — | — | 35D/94A | 35D | 40D |

Photo-initiator (PI) Curing wavelength (λ): *230-330 nm, 280-390 nm, *250-400 nm, **250-400 nm, ***250-400 nm

TABLE 7

1.35 Formulation

| Components | 1 | 2 | 3 |
|---|---|---|---|
| CN4003 | — | 2.28 | 0.94 |
| PRO12062 | — | 2.07 | — |
| CN4001 | — | 2.91 | — |
| MD700 | 61.27 | 45.22 | 59.35 |
| MD40 | 29.10 | 38.98 | 31.00 |
| 8FM | — | 0.18 | — |
| 8F | — | 0.20 | — |
| MAA | 1.40 | 0.77 | 1.36 |
| 3X | — | 0.78 | — |
| HDDA | 2.35 | 2.22 | 2.29 |
| Neo | 1.94 | 0.65 | 1.00 |
| Eb7100 | — | — | 0.03 |
| Ir3052 | — | — | 0.01 |
| UR210 | — | — | 0.02 |
| PI-1173* | 3.94 | 2.11 | 4.00 |
| PI-TPOL** | — | 1.63 | — |
| Polymer RI | 1.357 | 1.354 | 1.358 |
| Shore D/A | 20D/85A | 25D/90A | 20D/85A |

Photo-initiator (PI) Curing wavelength(λ):
*230-330 nm,
**280-390 nm

TABLE 8

1.36 Oligomer Formulations

| Components | 1 | 2 | 3 | 4 | 5 | 6 |
|---|---|---|---|---|---|---|
| CN4003 | — | — | — | 11.00 | 13.00 | 17.58 |
| PRO12062 | 68.34 | 80.51 | 79.26 | 75.21 | 75.21 | 76.66 |
| CN4001 | 1.77 | — | — | 7.36 | — | — |
| MD700 | 22.03 | 15.53 | 15.53 | — | — | 3.55 |
| MD40 | — | — | — | 1.00 | 7.36 | — |
| 8FM | 3.16 | — | 1.25 | 1.00 | — | — |
| 8F | 3.00 | — | — | — | — | — |
| MAA | — | 1.54 | 1.54 | 2.05 | 2.05 | 1.16 |
| 3X | — | — | 0.75 | — | 0.78 | — |
| HDDA | 0.59 | 0.48 | — | — | — | — |
| Neo | 0.6% | 0.48 | — | — | — | — |
| Eb7100 | — | — | 0.05 | — | — | — |
| Ir3052 | — | — | 0.04 | — | — | — |
| UR210 | — | — | 0.02 | — | — | — |
| PI-1173* | — | — | — | 0.39 | — | — |
| PI-TPOL** | — | — | — | 0.39 | — | — |
| PI-70/30*** | 0.53 | 1.46 | 1.56 | 1.60 | 1.60 | 1.05 |
| Polymer RI | 1.363 | 1.366 | 1.369 | 1.367 | 1.369 | 1.368 |
| Shore D/A | 15D/80A | 25D/87A | 25D/87A | 28D/89A | 28D/89A | 15D/83A |

Photo-initiator (PI) Curing wavelength (λ): *230-330 nm, 280-390 nm, *230-390 nm

TABLE 9

1.37 Oligomer Formulations

| Components | 1 | 2 | 3 | 4 | 5 | 6 |
|---|---|---|---|---|---|---|
| CN4003 | 9.47 | 26.31 | 14.18 | 14.18 | 27.91 | 27.91 |
| PRO12062 | 65.59 | 42.06 | 73.89 | 73.89 | 48.15 | 48.15 |
| CN4001 | 0.59 | — | 7.44 | — | 4.72 | — |
| MD700 | 9.68 | 25.69 | — | — | 14.52 | 14.52 |
| MD40 | — | — | — | 7.44 | — | 4.72 |
| 8FM | 5.56 | — | — | — | — | — |
| 8F | 4.26 | — | — | — | — | — |
| MAA | — | 2.00 | 1.56 | 1.35 | 2.00 | 2.33 |
| 3X | — | — | — | 0.15 | — | 0.27 |
| HDDA | 0.95 | — | 0.15 | — | — | — |
| Neo | 2.90 | 1.56 | — | — | 0.36 | — |
| Eb7100 | — | — | — | 0.04 | — | — |
| Ir3052 | — | — | — | 0.05 | — | — |
| UR210 | — | — | — | 0.04 | — | — |
| PI-1173* | — | — | — | — | 0.24 | — |
| PI-TPOL** | — | 0.54 | — | — | — | — |
| PI -70/30*** | 1.00 | 1.84 | 2.78 | 2.86 | 2.10 | 2.10 |
| Polymer RI | 1.370 | 1.375 | 1.372 | 1.374 | 1.378 | 1.378 |
| Shore D/A | 27D/ 91A | 35D/ 94A | 30D/ 89A | 30D/ 89A | 40D/ 90A | 40D/ 90A |

Photo-initiator (PI) Curing wavelength (λ): *230-330 nm, 280-390 nm, *230-390 nm

TABLE 10

1.38 Oligomer Formulations

| Components | 1 | 2 | 3 | 4 | 5 | 6 |
|---|---|---|---|---|---|---|
| CN4003 | 14.40 | 26.51 | 26.51 | 43.81 | 45.24 | 41.49 |
| PRO12062 | 48.58 | 4.03 | 4.03 | — | 26.56 | 21.53 |
| CN4001 | 1.06 | — | — | — | — | 6.17 |
| MD700 | 5.84 | 58.29 | 58.29 | 46.75 | 10.81 | 24.75 |
| MD40 | — | — | — | — | 7.53 | — |
| 8FM | 13.99 | — | — | — | 5.30 | — |
| 8F | 5.90 | — | — | — | — | — |
| MAA | — | 3.88 | 3.88 | 2.24 | 2.05 | 2.44 |
| 3X | — | 4.46 | 4.23 | — | 0.54 | 1.52 |
| HDDA | 4.59 | — | — | 1.42 | — | — |
| Neo | 4.53 | — | — | 1.43 | — | — |
| Eb7100 | — | — | 0.02 | — | — | — |
| Ir3052 | — | — | 0.05 | — | — | — |
| UR210 | — | — | 0.02 | — | — | — |
| PI-1173* | — | — | — | 1.00 | — | — |
| PI-TPOL** | — | — | — | 1.00 | — | — |
| PI -70/30*** | 1.11 | 2.83 | 2.97 | 2.35 | 1.97 | 2.10 |
| Polymer RI | 1.380 | 1.382 | 1.384 | 1.385 | 1.383 | 1.384 |
| Shore D/A | 25D/ 89A | 46D/ +100A | 46D/ +100A | 50D/ +100A | 42D/ 96A | 42D/ 97A |

Photo-initiator (PI) Curing wavelength (λ): *230-330 nm, 280-390 nm, *230-390 nm

TABLE 11

1.39 Oligomer Formulations

| Components | 1 | 2 | 3 | 4 | 5 | 6 |
|---|---|---|---|---|---|---|
| CN4003 | 32.08 | 46.84 | 50.88 | 50.88 | 46.83 | 28.46 |
| PRO12062 | 13.76 | 9.64 | 18.34 | 18.34 | 9.58 | — |
| CN4001 | — | 0.50 | 3.07 | — | 0.50 | — |
| MD700 | 35.77 | 27.40 | 16.59 | 16.59 | 27.51 | — |
| MD40 | — | 0.76 | — | — | 0.75 | 33.26 |
| 8FM | 3.76 | 2.60 | 2.06 | 2.06 | — | 9.56 |
| 8F | — | — | — | 4.10 | 2.58 | 13.76 |
| MAA | 3.51 | 2.41 | 2.24 | 2.24 | 2.41 | 3.51 |
| 3X | 7.97 | — | 4.50 | 3.24 | 1.53 | 4.50 |
| HDDA | — | 3.07 | — | — | 1.53 | — |
| Neo | — | 3.07 | — | — | 3.06 | 1.40 |
| Eb7100 | — | — | — | 0.03 | — | — |
| Ir3052 | — | — | — | 0.05 | — | — |
| UR210 | — | — | — | 0.05 | — | — |
| PI-1173* | — | 0.95 | — | — | 0.97 | — |
| PI-TPOL** | — | 1.59 | — | — | 1.59 | — |
| PI-70/30*** | 3.15 | 1.17 | 2.32 | 2.42 | 1.16 | 5.55 |
| Polymer RI | 1.391 | 1.395 | 1.393 | 1.398 | 1.387 | 1.393 |
| Shore D/A | 49D | 47D | 45D | 42D/90A | 50D | 45D |

Photo-initiator (PI) Curing wavelength (λ): *230-330 nm, 280-390 nm, *230-390 nm

TABLE 12

1.40 Oligomer Formulations

| Components | 1 | 2 | 3 | 4 | 5 | 6 |
|---|---|---|---|---|---|---|
| CN4003 | 37.64 | 42.62 | 49.84 | 54.46 | 60.15 | 40.64 |
| PRO12062 | 23.49 | 21.55 | 19.16 | 17.36 | 15.19 | 20.49 |
| CN4001 | — | — | 1.00 | — | — | — |
| MD700 | 13.24 | 12.15 | 8.27 | 9.75 | 8.53 | 13.00 |
| MD40 | — | — | 1.50 | — | — | — |
| 8FM | 7.52 | 6.90 | 5.16 | 4.67 | 4.09 | 8.00 |
| MAA | 3.14 | 2.88 | 2.57 | 2.33 | 2.04 | 3.00 |
| 3X | 11.48 | 10.53 | 8.50 | 7.44 | 10.00 | — |
| HDDA | — | — | 4.69 | — | — | — |
| Neo | — | — | 4.69 | — | — | 1.38 |
| Eb7100 | — | — | — | — | — | 0.05 |
| Ir3052 | — | — | — | — | — | 0.05 |
| UR210 | — | — | — | — | — | 0.05 |
| PI-1173* | — | — | 0.94 | — | — | 1.05 |
| PI-TPOL** | — | — | 2.18 | — | — | 2.29 |
| PI-70/30*** | 3.49 | 3.37 | — | 2.93 | 2.56 | — |
| Polymer RI | 1.401 | 1.402 | 1.404 | 1.406 | 1.401 | 1.403 |
| Shore D/A | 54D | 57D | 45D | 45D | 50D | 55D |

Photo-initiator (PI) Curing wavelength (λ): *230-330 nm, 280-390 nm, *230-390 nm

Legend Table

AF = perfluoropolyether urethane methacrylate (Ovation Polymers)
MD700 = Fluorolink MD700 (Solvay Solexis Co.)
MD500 = Fluorolink MD500 (Solvay Solexis Co.)
MD40 = Fomblin MD40 (Solvay Solexis Co.)
4001 = perfluoropolyether acrylate (Sartomer Co.)
4000 = perfluoropolyether acrylate (Sartomer Co.)
CN4003 = fluorinated urethane acrylate (Sartomer Co.)
PRO12062 = fluorinated urethane acrylate (Sartomer Co.)
MAA = methacrylic acid (Acros Chemical Corp.)
ASA = β-acrylolyl oxyethyl hydrogen succinate (Kowa American Corp.)
8FM = octafluoropentyl methacrylate (San Ester Corp.)
468 = 1H,1H-perfluorooctyl methacrylate (Exfluor Research Corp.)
8A = perfluorooctyl ethyl acrylate (Sinochem Shanghai)
8MA = perfluorooctyl ethyl methacrylate (FuxinHeng Tong Fluorine Chemicals Co. Ltd.)
6A = perfluorohexyl ethyl acrylate (Dupont Chemical Corp.)
6MA = perfluorohexyl ethyl methacrylate (FuxinHeng Tong Fluorine Chemicals Co. Ltd.)
322 = 1,1,1,2,2,4,4,5,5,5-decafluoropentan-3-yl acrylate (Exfluor Research Corp.)
222 = hexafluoroisopropyl acrylate (Synquest Lab.)
236 = hexafluoroisopropyl methacrylate (Synquest Lab.)
168 = trifluoroethyl methacrylate (Cornelius Chemical Corp.)
FFA = tetrahydrofurfuryl acrylate (Sartomer Co.)
Neo = neopentyl glycol diacrylate (Sartomer Co.)
HDDA = hexanediol diacrylate (Sartomer Co.)
DDA = perfluorodecyl acrylate (Exfluor Research Corp.)
3X = trimethylolpropane triacrylate (Sartomer Co.)
Eb7100 = Ebecryl 7100 (Cytec Surface Specialties Inc.)
Ir3052 = Irganox 3052 (BASF)
UR210 = Eversorb UR210 (Everlight Chemical Co.)
PI-1173 = 2-hydroxy 2-methyl 1-phenyl propan-1-one (BASF)
PI-TPO-L = Trimethylbenzoylphenyl phosphinate (BASF)
PI-70/30 = 70 wt % Trimethylbenzoylphenyl phosphinate 30 wt % 2-hydroxy 2-methyl 1-phenyl propan-1-one
PI-4265 = Trimethyl benzoyl diphenyl phosphine/2-hydroxy

TABLE 13

| Formulation | Tensile Strength @ YLD (psi) | Tensile Strain @ BRK (%) | Flex Modulus (psi) | Viscosity (cps) @ 25° C. | Refractive Index @ 589 nm and 25° C. | Thermal gravimetric analysis (° C.) @ 5% decomposition |
|---|---|---|---|---|---|---|
| Table 3 #8 | 246 | 18 | 3335 | 500 | 1.330 | 260 |
| Table 4 #1 | 362 | 14 | 5220 | 450 | 1.341 | 250 |
| Table 6 #5 | 435 | 11 | 9140 | 400 | 1.353 | 260 |
| Table 2 #2 | — | — | — | 1000 | 1.330 | — |
| Table 7 #2 | — | — | — | 1500 | 1.354 | — |
| Table 8 #6 | — | — | — | 4850 | 1.368 | — |
| Table 10 #6 | — | — | — | 5500 | 1.384 | — |
| Table 12 #5 | — | — | — | 5450 | 1.400 | — |
| Methods | ASTM D-638 | ASTM D-638 | ASTM D-790 | — | — | — |

Legend Table 2-methyl 1-phenyl propan-1-one (BASF)
PI-213 = Trimethylbenzoyldiphenylphosphine oxide/2-hydroxy 2-methyl 1-phenyl propan-1-one (BASF)
PI-2022 = 2-hydroxy 2-methyl 1-phenyl propan-1-one/Phenylbis(2,4,6-trimethylbenzoyl)-phosphine oxide) (BASF)

EXAMPLE C

Low Viscosity Solution Composition

In yet another embodiment of the invention, lower viscosity solution composition can be made by simple addition of evaporative/volatile solvent or solvent blends to the UV curable compositions as defined in Table 1-12. By use of this embodiment of the current invention, a range of application viscosities, and therefore coating thickness, may be achieved without substantial changes in the desired physical properties. Good solvents for addition to the invention include standard commercially available fluorocarbon and hydrocarbon solvents, but are not limited to, 3M's HFE fluorinated solution product line (HFE-7100, -7200, -7300, & -7500, Fluorinert™ FC40 & FC70 and various grades thereof), fluorinated alcohols, fluorinated and non-fluorinated aliphatic and aromatics, dichloromethane, methyl Ethyl propyl butyl Acetate and the like. The solvent blends are tailored to the substrate, formulation, application process and end use of each particular application in which a thin low refractive index coating is required.

Examples of such solution composition is the addition of a HFE-7500 and ethyl acetate blend in weight percent ratio of 3:7 (HFE-7500:ethyl acetate) to which is added the curable composition of Formulation 1 of tables 1, at 1-40 wt % in order to obtain a solution viscosity of 10cPs to 100cPs measured at room temperature. The solution composition was first coated on the substrate and solvent was evaporated at room temperature and subsequently cured under UV-radiation to generate ultra low refractive index coatings. The solvent blended formulations after cure and anneal produced thinner films, when compared to the non-diluted version formulation illustrated in Example 2, with the same physical properties.

While certain representative embodiments and details have been shown for the purpose of illustrating the subject invention, it will be apparent to those skilled in this art that various changes and modifications can be made therein without departing from the scope of the subject invention.

What is claimed is:

1. A cross-linking agent which is particularly useful in making optically clear low refractive index coatings having a structural formula selected from the group consisting of:

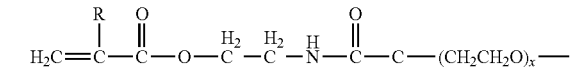

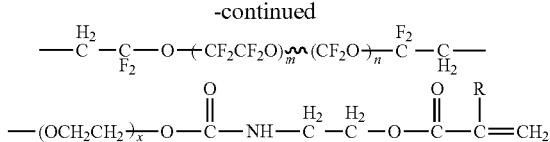

and

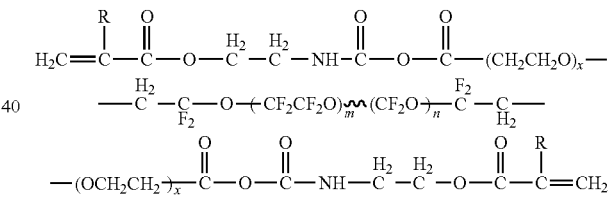

wherein R represents a hydrogen atom or a methyl group, wherein m represents an integer of 2 or higher, wherein n represents an integer of 2 or higher, wherein x represents an integer of greater than 0 and wherein the —(CF$_2$CF$_2$O)— repeat units and the —(CF$_2$O)— repeat units can be distributed in any order, wherein R represents a hydrogen atom or a methyl group, wherein m represents an integer of 2 or higher, wherein n represents an integer of 2 or higher, and wherein ~ indicates that the —(CF$_2$CF$_2$O)— repeat units and the —(CF$_2$O)— repeat units can be distributed in any order.

2. The cross-linking agent as specified in claim 1 wherein the ratio of the integer m to the integer n is within the range of 1:1 to 3:1.

3. The cross-linking agent as specified in claim 1 wherein n represents an integer from 1 to 12.

4. The cross-linking agent as specified in claim 1 wherein n represents the integer 2.

5. The cross-linking agent as specified in claim 1 wherein R represents a hydrogen atom.

6. The cross-linking agent as specified in claim 1 wherein R represents a methyl group.

* * * * *